United States Patent
Kuo (10) Patent No.: US 8,555,457 B1
(45) Date of Patent: Oct. 15, 2013

(54) WINDSHIELD WIPER ASSEMBLY THAT CAN REDUCE RUBBING RESISTANCE AND ELIMINATE NOISE

(71) Applicant: Ming-Yi Kuo, Changhua Hsien (TW)

(72) Inventor: Ming-Yi Kuo, Changhua Hsien (TW)

(73) Assignee: Faidek Corporation, Changhua Hsien (TW)

( * ) Notice: Subject to any disclaimer, the term of this patent is extended or adjusted under 35 U.S.C. 154(b) by 0 days.

(21) Appl. No.: 13/747,515

(22) Filed: Jan. 23, 2013

(51) Int. Cl.
*B60S 1/40* (2006.01)
*B60S 1/38* (2006.01)

(52) U.S. Cl.
USPC .................................. 15/250.32; 15/250.361

(58) Field of Classification Search
USPC ............. 15/250.32, 250.43, 250.44, 250.361, 15/250.21, 250.23, 250.33, 250.351, 15/250.46
See application file for complete search history.

(56) References Cited

U.S. PATENT DOCUMENTS

| 743,801 | A | * | 11/1903 | Anderson | 15/250.33 |
| 2,576,809 | A | * | 11/1951 | Rappl | 15/250.32 |
| 2,946,078 | A | * | 7/1960 | Deibel et al. | 15/250.32 |
| 3,978,542 | A | * | 9/1976 | Van Eekelen et al. | 15/250.3 |
| 7,302,732 | B2 | * | 12/2007 | Alley | 15/250.4 |

FOREIGN PATENT DOCUMENTS

| CH | 611563 | * | 6/1979 |
| JP | 60-92136 | * | 5/1985 |

* cited by examiner

*Primary Examiner* — Gary Graham
(74) *Attorney, Agent, or Firm* — Muncy, Geissler, Olds & Lowe, PLLC (57) ABSTRACT

A windshield wiper assembly for a car includes a wiper unit connected with a support arm. The wiper unit includes a blade having a mounting seat, a wiper connected with the blade, a movable bracket movably mounted in the mounting seat, at least one support pin secured on the mounting seat and extended through the movable bracket, and at least one pair of elastic members each biased between the mounting seat and the movable bracket. The movable bracket is biased between the elastic members. Thus, the movable bracket is moved relative to and deflected from the mounting seat when the wiper unit is driven by the support arm to reduce the frictional resistance. In addition, the elastic members provide a shock-absorbing function between the mounting seat and the movable bracket to eliminate vibration produced during movement of the wiper unit.

6 Claims, 8 Drawing Sheets

WINDSHIELD WIPER ASSEMBLY THAT CAN REDUCE RUBBING RESISTANCE AND ELIMINATE NOISE

BACKGROUND OF THE INVENTION

1. Field of the Invention

The present invention relates to a windshield wiper and, more particularly, to a windshield wiper assembly for a car.

2. Description of the Related Art

Figure 8:
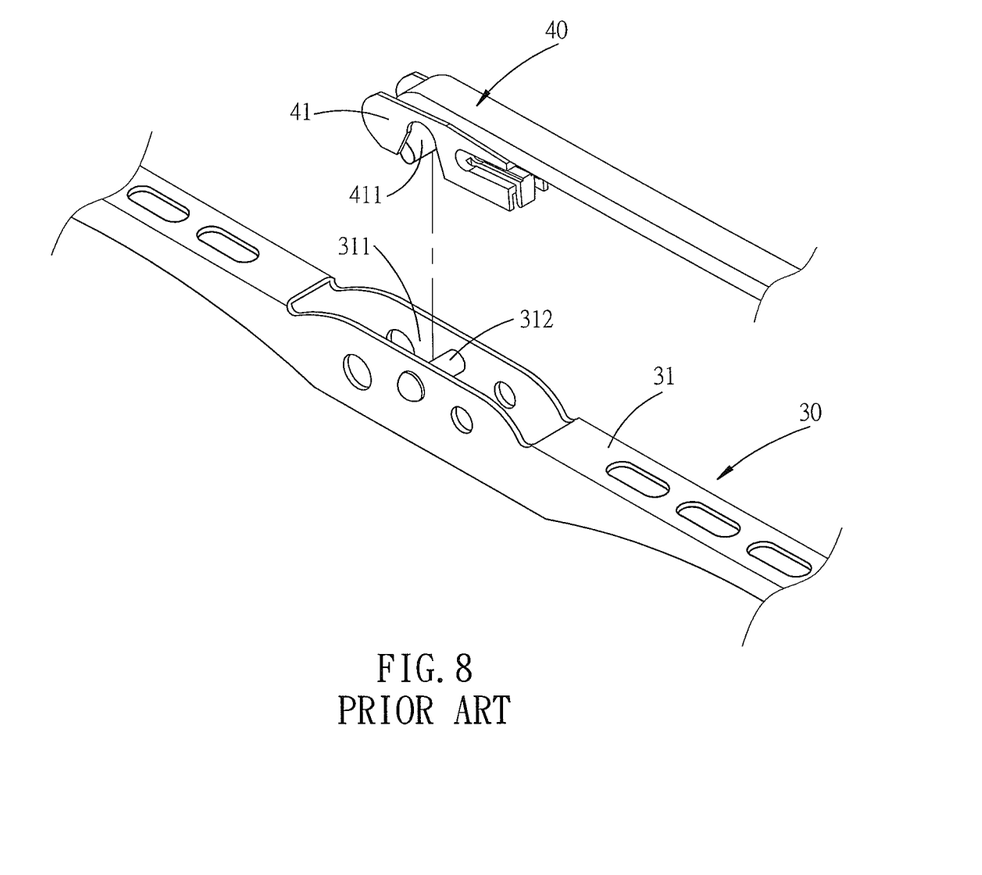
FIG. 8 is an exploded perspective view of a conventional windshield wiper assembly in accordance with the prior art.

A conventional windshield wiper assembly for a car in accordance with the prior art shown in FIG. 8 comprises a support arm 40 having a connecting portion 41, and a wiper unit 30 connected with the connecting portion 41 of the support arm 40. The connecting portion 41 of the support arm 40 has a bottom provided with a snap-fit recess 411. The wiper unit 30 includes a blade 31 having a central portion provided with a hollow mounting seat 311, a resilient wiper (not shown) connected with the blade 31, and a connecting member 312 secured in the mounting seat 311 and connected with the connecting portion 41 of the support arm 40. The connecting member 312 is snapped into the snap-fit recess 411 of the connecting portion 41. In operation, the connecting member 312 is connected with the connecting portion 41 of the support arm 40 so that the wiper unit 30 is connected with the support arm 40. Thus, when the support arm 40 is driven by a drive motor and is pivoted on the windshield of a car, the wiper unit 30 is driven by the support arm 40 to move on the windshield so as to rub and clean the windshield by the wiper.

However, when the wiper is moved on the windshield to clear the grease, dirt, dust or contaminant deposited on the windshield, a drag is produced due to a friction between the wiper and the windshield, so that the wiper easily produces vibration and noise during movement of the wiper unit 30. In addition, when the car is moved at a high speed, the air flow impacts the wiper of the wiper unit 30 and passes under the blade 31 to produce a vibration during movement of the wiper unit 30 and to increase the frictional resistance of the wiper unit 30 due to an excessive force so that the wiper unit 30 is easily worn out and easily produces noise, thereby decreasing the lifetime of the wiper unit 30, and easily causing an uncomfortable sensation to the driver in the car.

BRIEF SUMMARY OF THE INVENTION

In accordance with the present invention, there is provided a windshield wiper assembly, comprising a support arm having a connecting portion, and a wiper unit connected with the connecting portion of the support arm. The wiper unit includes a blade having a central portion provided with a mounting seat, a resilient wiper connected with the blade, a movable bracket movably mounted in the mounting seat of the blade, at least one support pin secured on the mounting seat of the blade and extended through the movable bracket, and at least one pair of elastic members each mounted in the mounting seat of the blade and each biased between the mounting seat of the blade and the movable bracket. The mounting seat of the wiper unit has an interior provided with a receiving chamber. The movable bracket of the wiper unit is received in the receiving chamber of the mounting seat and is connected with the connecting portion of the support arm. The movable bracket of the wiper unit has two opposite sidewalls each provided with at least one through hole slidable on the support pin. The movable bracket of the wiper unit is biased between the elastic members. Each of the elastic members of the wiper unit is mounted on the support pin and is received in the receiving chamber of the mounting seat.

Thus, the movable bracket is moved relative to and deflected from the mounting seat of the blade when the wiper unit is driven by the support arm to reduce a frictional resistance applied on the wiper and the blade. In addition, the elastic members provide a shock-absorbing function between the mounting seat of the blade and the movable bracket so as to eliminate vibration produced during movement of the wiper unit.

The mounting seat of the wiper unit has a hollow shape. The mounting seat of the wiper unit has two opposite sidewalls each connected to the blade. The movable bracket of the wiper unit is movable on the support pin and is movable relative to the mounting seat of the blade. The movable bracket of the wiper unit is spaced from and not connected with the mounting seat of the wiper unit. The sidewalls of the movable bracket are not connected with the sidewalls of the mounting seat.

The wiper unit further includes at least one bushing mounted on the support pin and located in the movable bracket. The bushing of the wiper unit has two opposite ends abutting the sidewalls of the movable bracket.

The wiper unit further includes at least one washer mounted on the support pin and located between the bushing and the movable bracket, and a connecting member or a lock connecting member secured in the movable bracket and connected with the connecting portion of the support arm.

The wiper unit further includes at least one tension adjusting plate mounted in the mounting seat of the blade and biased between the mounting seat of the blade and the elastic members to adjust a tension of the elastic members.

The primary objective of the present invention is to provide a windshield wiper assembly that can reduce rubbing resistance and eliminate noise.

According to the primary advantage of the present invention, the movable bracket is moved relative to and slightly deflected from the mounting seat of the blade during pivotal movement of the wiper unit to reduce the frictional resistance applied on the wiper and the blade, so that the wiper unit is moved on the windshield smoothly and conveniently.

According to another advantage of the present invention, the elastic members are biased between the mounting seat of the blade and the movable bracket to provide a shock-absorbing function between the mounting seat of the blade and the movable bracket so as to efficiently reduce the vibration or shock produced during movement of the wiper unit.

According to a further advantage of the present invention, the wiper unit is moved on the windshield smoothly so that the wiper is not worn out easily during a long-term utilization, thereby enhancing the lifetime of the wiper.

According to a further advantage of the present invention, the wiper unit is moved on the windshield smoothly so that the wiper unit will not interfere with operation of the drive motor, thereby enhancing the lifetime of the drive motor.

Further benefits and advantages of the present invention will become apparent after a careful reading of the detailed description with appropriate reference to the accompanying drawings.

DETAILED DESCRIPTION OF THE INVENTION

Referring to the drawings and initially to FIGS. 1-6, a windshield wiper assembly for a car in accordance with the preferred embodiment of the present invention comprises a support arm 20 having a connecting portion 21, and a wiper unit 10 connected with the connecting portion 21 of the support arm 20.

The wiper unit 10 includes a blade 11 having a central portion provided with a mounting seat 111, a resilient wiper 12 connected with the blade 11, a movable bracket 112 movably mounted in the mounting seat 111 of the blade 11, at least one support pin 113 secured on the mounting seat 111 of the blade 11 and extended through the movable bracket 112, and at least one pair of elastic members 115 each mounted in the mounting seat 111 of the blade 11 and each biased between the mounting seat 111 of the blade 11 and the movable bracket 112.

The mounting seat 111 of the wiper unit 10 has a hollow shape and has an interior provided with a receiving chamber 114. The mounting seat 111 of the wiper unit 10 has two opposite sidewalls each connected to the blade 11. The movable bracket 112 of the wiper unit 10 is received in the receiving chamber 114 of the mounting seat 111 and is connected with the connecting portion 21 of the support arm 20. The movable bracket 112 of the wiper unit 10 is movable on the support pin 113 and is movable relative to the mounting seat 111 of the blade 11. The movable bracket 112 of the wiper unit 10 has a substantially U-shaped profile and has two opposite sidewalls each provided with at least one through hole 1121 slidable on the support pin 113. The through hole 1121 of the movable bracket 112 has an oblong shape. The movable bracket 112 of the wiper unit 10 is biased between the elastic members 115. The movable bracket 112 of the wiper unit 10 is spaced from and not connected with the mounting seat 111 of the wiper unit 10. The sidewalls of the movable bracket 112 are not connected with the sidewalls of the mounting seat 111. Each of the elastic members 115 of the wiper unit 10 is mounted on the support pin 113 and is received in the receiving chamber 114 of the mounting seat 111. The support pin 113 of the wiper unit 10 is received in the receiving chamber 114 of the mounting seat 111.

The wiper unit 10 further includes at least one bushing 116 mounted on the support pin 113 and located in the movable bracket 112, at least one washer 117 mounted on the support pin 113 and located between the bushing 116 and the movable bracket 112, and a connecting member 1122 secured in the movable bracket 112 and connected with the connecting portion 21 of the support arm 20. The bushing 116 of the wiper unit 10 has two opposite ends abutting the sidewalls of the movable bracket 112 to reinforce the whole strength of the movable bracket 112.

In the preferred embodiment of the present invention, the wiper unit 10 includes two support pins 113, two pairs of elastic members 115, and two bushings 116, and each of the sidewalls of the mounting seat 111 is provided with two through holes 1121. The connecting member 1122 is disposed between the support pins 113.

Figure 1:
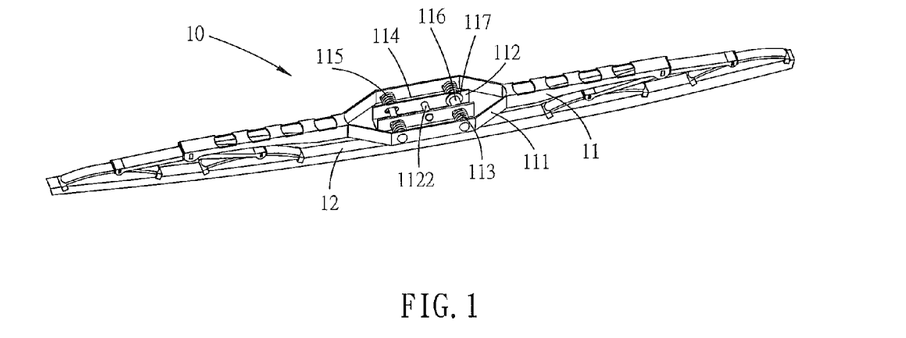
FIG. 1 is a perspective view of a windshield wiper assembly in accordance with the preferred embodiment of the present invention.
Figure 2:
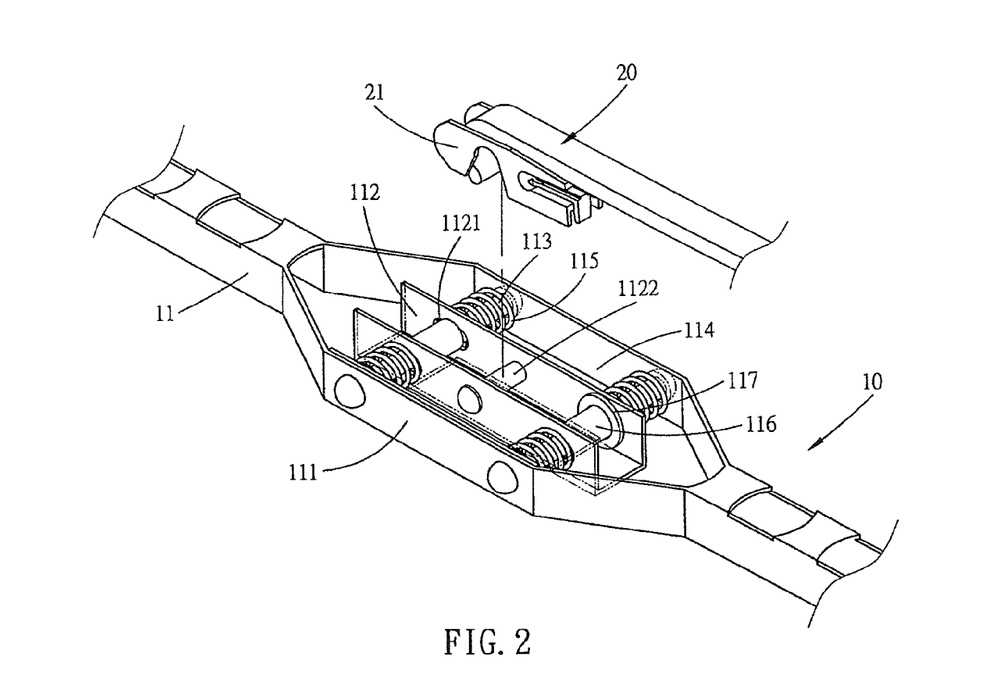
FIG. 2 is an exploded perspective view of a windshield wiper assembly in accordance with the preferred embodiment of the present invention.
Figure 3:
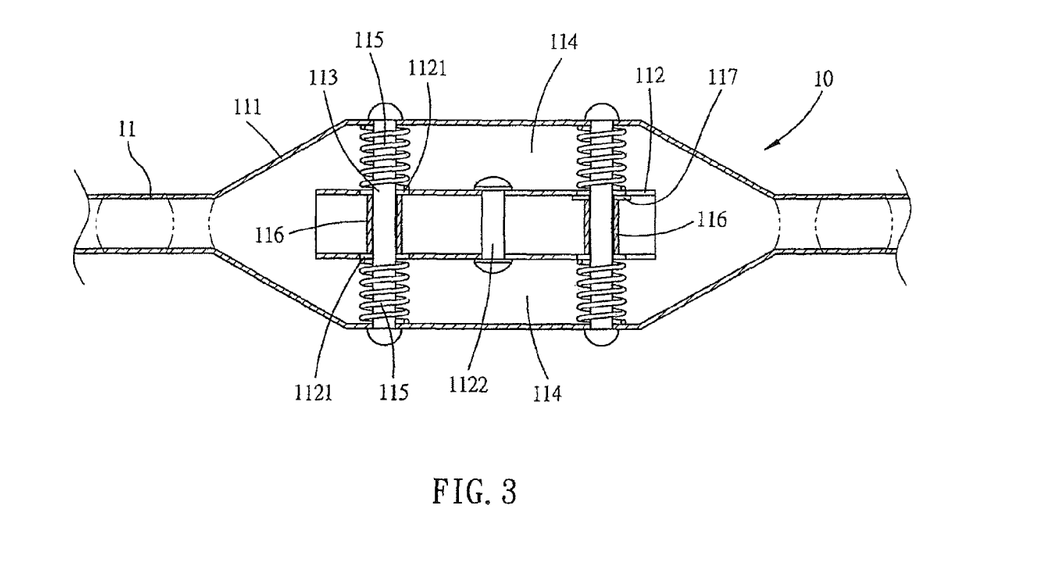
FIG. 3 is a top cross-sectional assembly view of the windshield wiper assembly as shown in FIG. 2.
Figure 4:
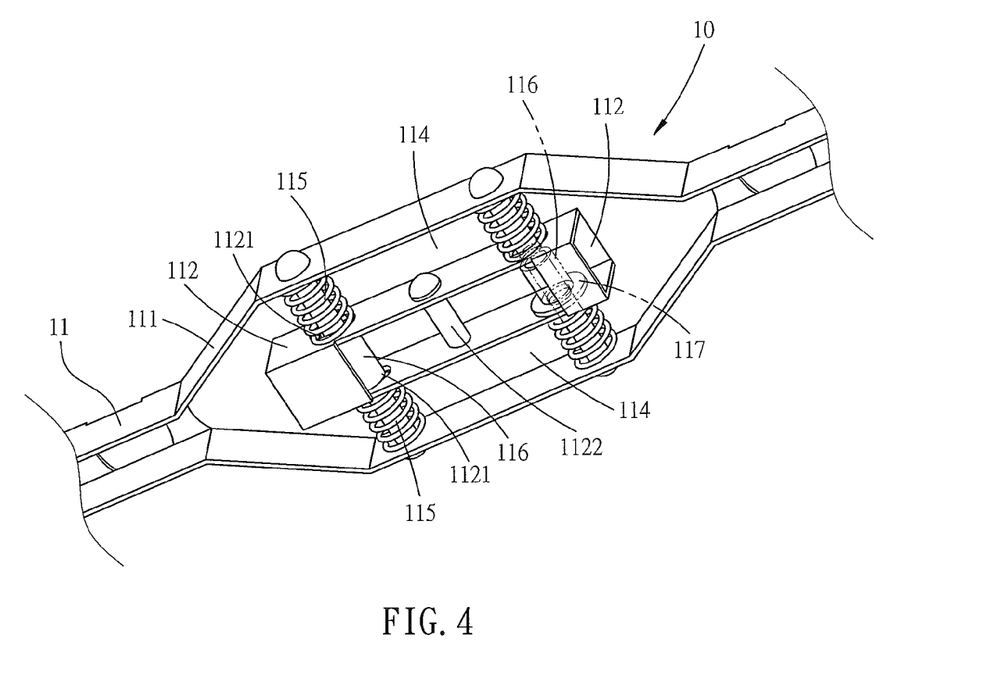
FIG. 4 is a bottom perspective view of the windshield wiper assembly as shown in FIG. 2.
Figure 5:
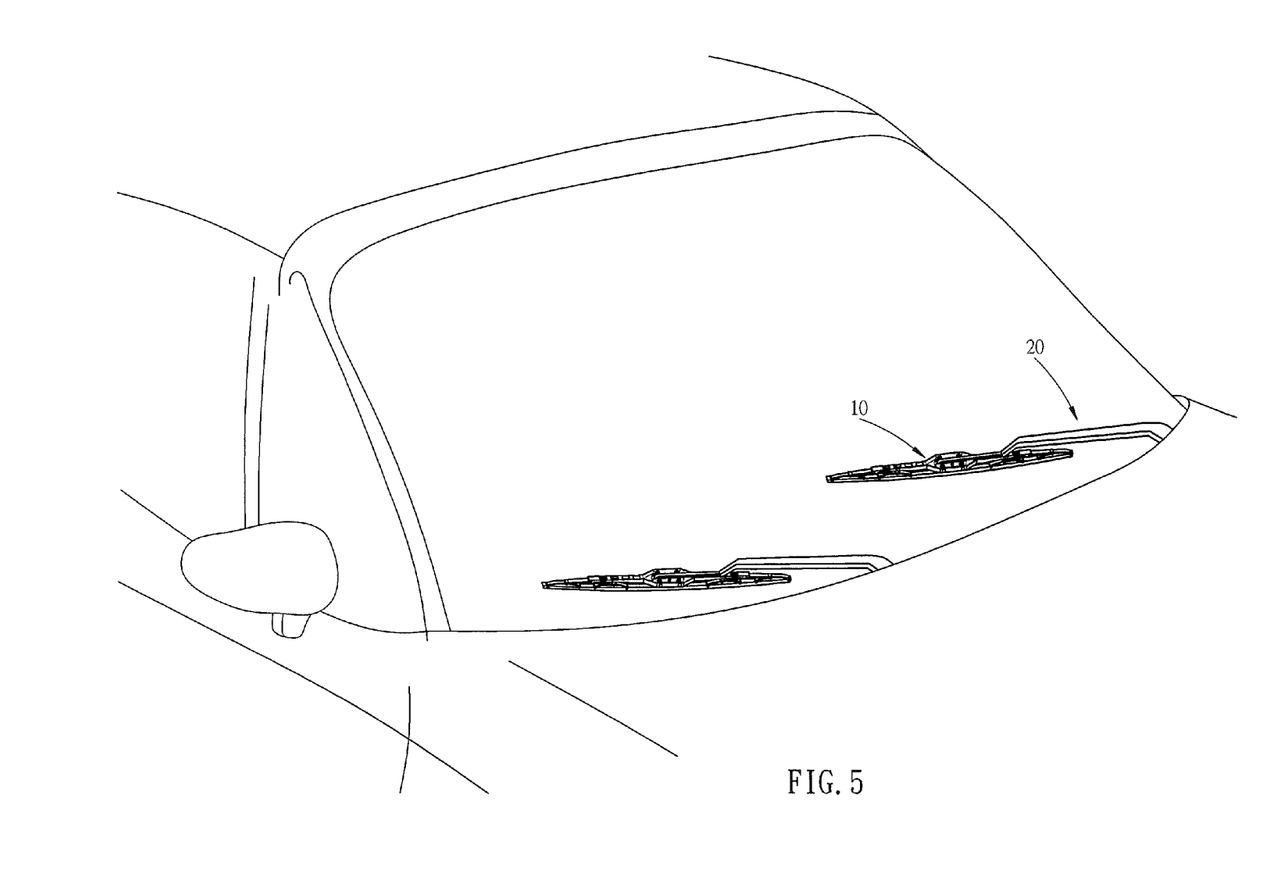
FIG. 5 is a perspective assembly operational view of the windshield wiper assembly as shown in FIG. 2.
Figure 6:
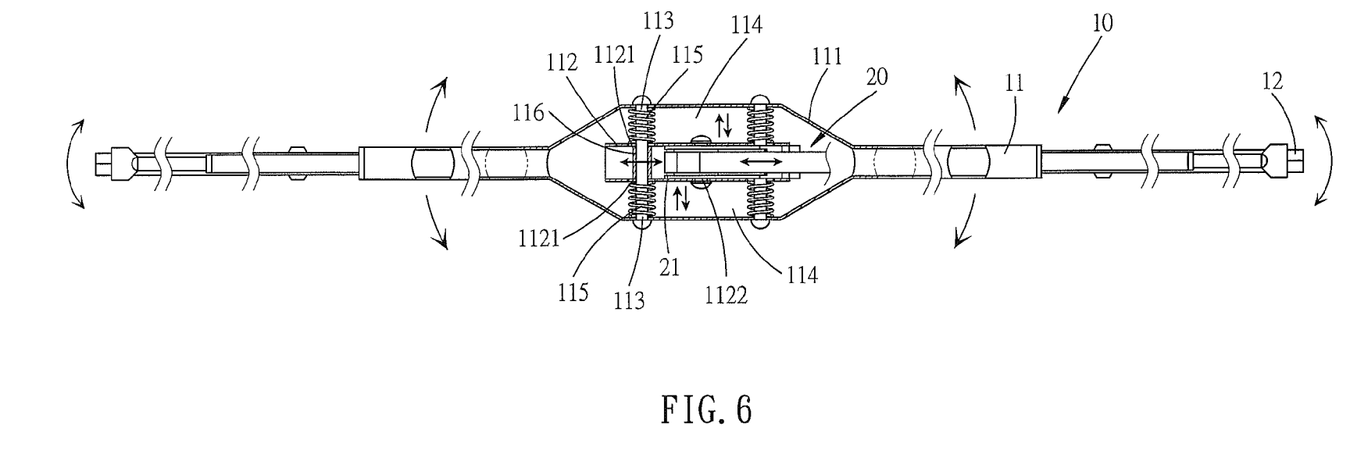
FIG. 6 is a top cross-sectional operational view of the windshield wiper assembly as shown in FIG. 5.

In operation, referring to FIGS. 5 and 6 with reference to FIGS. 1-4, the connecting member 1122 of the wiper unit 10 is connected with the connecting portion 21 of the support arm 20 so that the wiper unit 10 is connected with the support arm 20. Thus, when the support arm 20 is driven by a drive motor and is pivoted on the windshield of a car, the wiper unit 10 is driven by the support arm 20 to move on the windshield so as to rub and clean the windshield by the wiper 12. At this time, the movable bracket 112 is moved relative to and deflected from the mounting seat 111 of the blade 11 when the wiper unit 10 is driven by the support arm 20 to reduce the frictional resistance applied on the wiper 12 and the blade 11, so that the wiper unit 10 is moved on the windshield smoothly and conveniently. In addition, the elastic members 115 are biased between the mounting seat 111 of the blade 11 and the movable bracket 112 to provide a shock-absorbing function between the mounting seat 111 of the blade 11 and the movable bracket 112 so as to eliminate vibration or shock produced during movement of the wiper unit 10.

Figure 7:
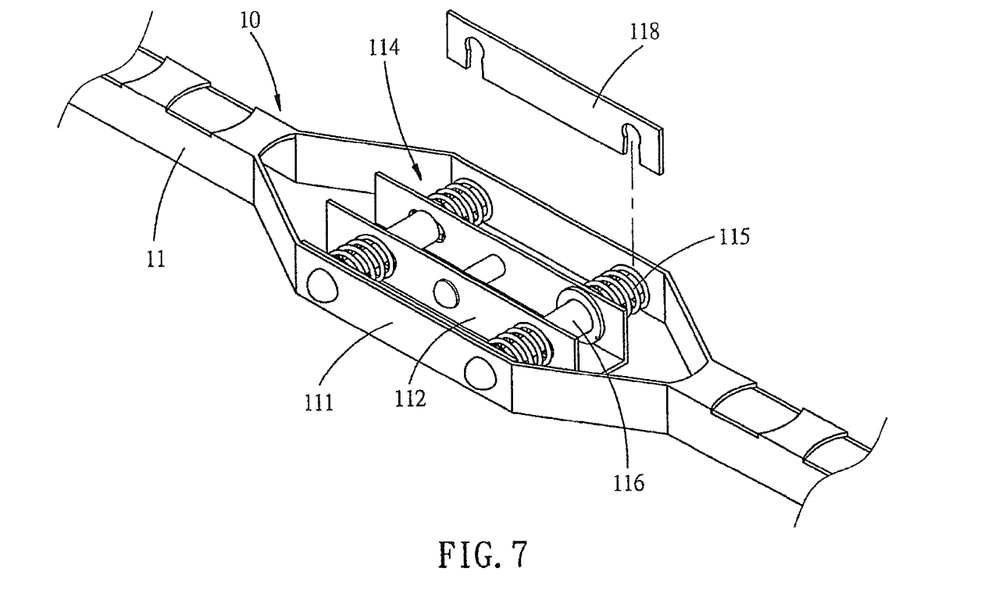
FIG. 7 is a partially exploded perspective view of a windshield wiper assembly in accordance with another preferred embodiment of the present invention.

Referring to FIG. 7, the wiper unit 10 further includes at least one tension adjusting plate 118 mounted in the mounting seat 111 of the blade 11 and biased between the mounting seat 111 of the blade 11 and the elastic members 115 to adjust a tension of the elastic members 115. Thus, when the elastic members 115 produce an elastic fatigue, the tension adjusting plate 118 is received in the receiving chamber 114 of the mounting seat 111 and is biased between the mounting seat 111 of the blade 11 and the elastic members 115 to compress the elastic members 115 so as to adjust the tension of the elastic members 115.

Accordingly, the movable bracket 112 is moved relative to and slightly deflected from the mounting seat 111 of the blade 11 during pivotal movement of the wiper unit 10 to reduce the frictional resistance applied on the wiper 12 and the blade 11, so that the wiper unit 10 is moved on the windshield smoothly and conveniently. In addition, the elastic members 115 are biased between the mounting seat 111 of the blade 11 and the movable bracket 112 to provide a shock-absorbing function between the mounting seat 111 of the blade 11 and the movable bracket 112 so as to efficiently reduce the vibration or shock produced during movement of the wiper unit 10. Further, the wiper unit 10 is moved on the windshield smoothly so that the wiper 12 is not worn out easily during a long-term utilization, thereby enhancing the lifetime of the wiper 12. Further, the wiper unit 10 is moved on the windshield smoothly so that the wiper unit 10 will not interfere with operation of the drive motor, thereby enhancing the lifetime of the drive motor.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A windshield wiper assembly, comprising:
a support arm having a connecting portion; and
a wiper unit connected with the connecting portion of the support arm; wherein:

the wiper unit includes:

a blade having a central portion provided with a mounting seat;

a resilient wiper connected with the blade;

a movable bracket movably mounted in the mounting seat of the blade;

at least one support pin secured on the mounting seat of the blade and extended through the movable bracket; and at least one pair of elastic members each mounted in the mounting seat of the blade and each biased between the mounting seat of the blade and the movable bracket;

the mounting seat of the wiper unit has an interior provided with a receiving chamber;

the movable bracket of the wiper unit is received in the receiving chamber of the mounting seat and is connected with the connecting portion of the support arm;

the movable bracket of the wiper unit has two opposite sidewalls each provided with at least one through hole slidable on the support pin;

the movable bracket of the wiper unit is biased between the elastic members;

each of the elastic members of the wiper unit is mounted on the support pin and is received in the receiving chamber of the mounting seat;

the movable bracket is moved relative to and deflected from the mounting seat of the blade when the wiper unit is driven by the support arm to reduce a frictional resistance applied on the wiper and the blade; and the elastic members provide a shock-absorbing function between the mounting seat of the blade and the movable bracket so as to eliminate vibration produced during movement of the wiper unit.

2. The windshield wiper assembly of claim 1, wherein:

the mounting seat of the wiper unit has a hollow shape;

the mounting seat of the wiper unit has two opposite sidewalls each connected to the blade;

the movable bracket of the wiper unit is movable on the support pin and is movable relative to the mounting seat of the blade;

the movable bracket of the wiper unit is spaced from and not connected with the mounting seat of the wiper unit; and the sidewalls of the movable bracket are not connected with the sidewalls of the mounting seat.

3. The windshield wiper assembly of claim 1, wherein:

the wiper unit further includes at least one bushing mounted on the support pin and located in the movable bracket; and the bushing of the wiper unit has two opposite ends abutting the sidewalls of the movable bracket.

4. The windshield wiper assembly of claim 3, wherein the wiper unit further includes at least one washer mounted on the support pin and located between the bushing and the movable bracket.

5. The windshield wiper assembly of claim 1, wherein the wiper unit further includes at least one tension adjusting plate mounted in the mounting seat of the blade and biased between the mounting seat of the blade and the elastic members to adjust a tension of the elastic members.

6. The windshield wiper assembly of claim 1, wherein the wiper unit further includes a connecting member secured in the movable bracket and connected with the connecting portion of the support arm.

* * * * *